Patented Jan. 9, 1923.

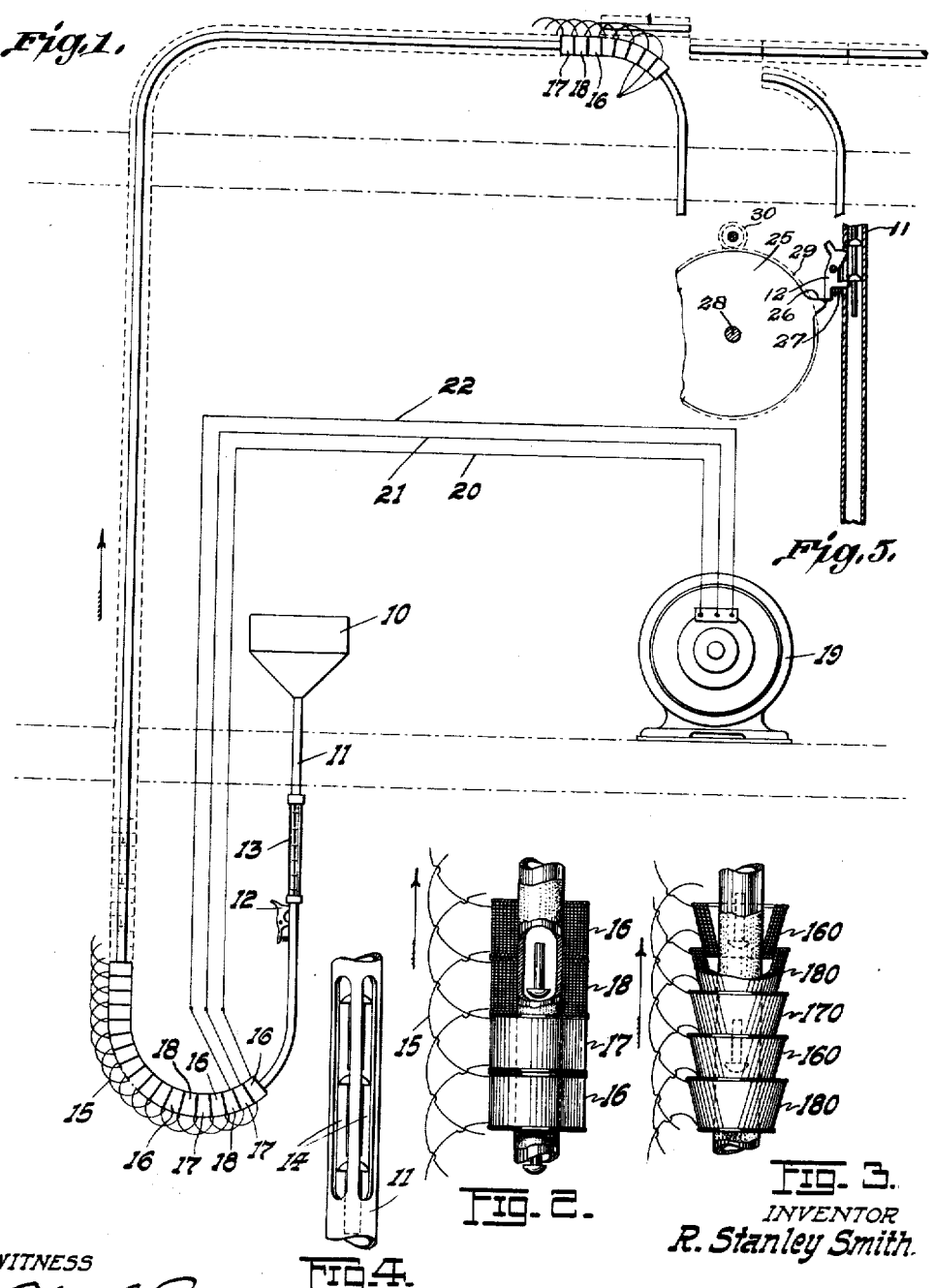

1,441,250

UNITED STATES PATENT OFFICE.

REUBEN STANLEY SMITH, OF MILWAUKEE, WISCONSIN, ASSIGNOR TO A. O. SMITH CORPORATION, OF MILWAUKEE, WISCONSIN, A CORPORATION OF NEW YORK.

ELECTROMAGNETIC DEVICE FOR SERVING RIVETS TO NAILING MACHINES.

Application filed July 26, 1920. Serial No. 399,146.

*To all whom it may concern:*

Be it known that I, REUBEN STANLEY SMITH, a citizen of the United States, and resident of the city of Milwaukee, in the county of Milwaukee and State of Wisconsin, have invented certain new and useful Improvements in Electromagnetic Devices for Serving Rivets to Nailing Machines; and I do declare the following to be a clear, exact, and complete description thereof, such as will enable others skilled in the art to which the invention pertains to make and use the same, reference being had to the accompanying drawing as showing one construction in which the invention has been embodied.

The invention relates to devices for serving rivets to automatic nailing machines, and is devised primarily for use in connection with the manufacture of automobile and other vehicle frames.

As now generally constructed, automobile frames are constituted of channeled side and cross bars, which are drawn from blanks punched from sheet metal strips or plates. The flanges formed in such bars by turning the side margins of the blank in the drawing operation, together with the sectional web of the bar, serve to endow the frame with the degree of rigidity necessary to enable it to withstand the various severe strains to which it may be subjected under certain conditions attending the use of the automobile. The bars constituting the frame parts are suitably perforated at points where they engage each other in the assembly of the parts, and are permanently connected so as to form a unitary structure, by means of rivets which are placed in the said perforations and spread or upset, to thus firmly and rigidly secure the frame parts in their several positions.

In the methods now prevailing in automobile frame construction, it is the practice to insert the rivets by hand in the perforations with which the frame parts are provided. The work of thus inserting the rivets is laborious and cannot be accomplished with that degree of expedition which is highly desirable in connection with the manufacture of automobile frames at the present time. The purpose of the present invention is to overcome the objections of the former methods and to enable the speedy performance by mechanical means of that which heretofore required an unnecessary expenditure of time and manual labor.

In my application, Serial No. 212,934, filed Jan. 21, 1918, patented November 15, 1921, #1,397,020, I have disclosed an assemblage of machines, which by their related, connected, and successive operations, punch from metal strips and plates the side and cross bar and other blanks used in constructing an automobile or other vehicle frame, shape such blanks according to the particular requirements appertaining to each, perform the necessary milling operations thereon, including punching and reaming, assemble the several frame parts in proper relation, and permanently secure all of such parts in their respective positions by means of rivets, so that in a continuous operation of mechanical devices a completed automobile or other vehicle frame is automatically constructed, upon a schedule providing for the production of a given number of frames per minute.

The assemblage referred to embodies as elements of its construction, certain devices which are designed to serve or feed the rivets to automatic nailing machines located at one of the stations of the assemblage. The nailing machines drive the rivets into the registering perforations in the frame parts, wherein they may be held by frictional engagement or otherwise, until the assembled frame parts are presented to the riveting mechanism located at the next station. In the operation of the said riveting mechanism, the points of the rivets are upset or spread so as to complete the permanent union of the parts. The present invention relates to a development of the rivet serving mechanism disclosed in the patent above referred to.

My present invention relates to a rivet serving mechanism, in which a constant stream of rivets is caused by magnetic attraction to flow from the source of supply to the point or points of distribution, which latter have such location that the rivets are then in position for action by the nailing mechanism. The line of movement of the stream of rivets is through a shifting magnetic field, created by electric currents passed through a succession of coils which are arranged as a long solenoid. After traversing the magnetic field, the rivets are released from the influence thereof, and are free to be directed to their proper positions with relation to the assembled frame parts, for action by the nailing mechanism.

The rivets are supplied by a hopper, from which a conduit leads to the point where the rivets are presented for action by the nailing mechanism. The said conduit is encircled by a succession of coils, which, when energized by suitably varying electric currents, will create a shifting magnetic field, which, in turn, traversing such coils will so act as to carry the rivets to the points of distribution. The coils of the solenoid are arranged in groups, the number of which groups will be determined by the distance the rivets are to be transported. Each of the groups of coils comprises a plurality of coils, with the respective coils of one group connected in series to the similarly situated coils of the next group, this arrangement being repeated throughout the extent of the long solenoid system. This particular arrangement has been found desirable, inasmuch as it permits a gradual floating movement of a rivet from one coil to the next, as the coils of each group are energized and de-energized in succession, so that as the magnetic attraction of one coil diminishes, the energization of the next coil creates a resultant attractive force which will move the rivet from the diminishing field to the freshly created field next in advance. Thus, the spaced and floating rivets are caused to gradually and progressively traverse the whole length of the traveling magnetic field of the solenoid system, and having reached the last coil of the last group, will be freed from the magnetic attraction upon demagnetization of the said coil, and be permitted by the force of gravity, or other means, to slide or fall into position for operation by the nailing mechanism, by means of which they are set in the desired positions in the assembled frame parts.

To energize the separate coils of each group in succession, I may, for instance, employ a polyphase generator, and release the rivets from the hopper in regulated time cycles, so that the rivets will enter the magnetic field synchronously with the energization of the first coil of each group. The polyphase currents energize the coils of each group in succession throughout the length of the solenoid, so that the rivets are moved freely by the shifting magnetic force thus created. This movement of the rivets with the traveling magnetic field continues until the last of the coils is reached, and when no longer sustained by magnetic attraction, the rivets will be released for a further movement into their distributive positions, as hereinbefore described.

The construction of the long solenoid in successive groups of coils or sections makes the system a flexible one, and enables the total length of the magnetic field system to be easily varied by arranging the groups of coils in such number as may be necessary to achieve the desired results.

The coils entering into the construction described may be of the ordinary spool form with their ends abutting. As an alternative arrangement, the said coils may be in the form of truncated cones, the reduced end of each coil being inserted within the larger opening in the base of the adjacent coil.

The conduit leading from the hopper is provided with a visual indicator, by means of which it may be ascertained whether the rivets are running out of the hopper properly, or that replenishment of the supply of rivets is necessary.

The said conduit at a point somewhat in advance of the first coil, is also provided with an escapement device, which will be operated by a timing mechanism, acting to release the rivets singly and subject them to the influence of the magnetic force, the actuation of the escapement and release of the rivets being usually synchronous with the seriatim energization of the first coil of each group.

The novel features of my invention will be pointed out in the appended claims.

In the drawings which accompany this specification, Figure 1 shows diagrammatically in elevation, the arrangement of the devices constituting my improved rivet serving mechanism.

Fig. 2 is a fragmentary view in elevation, of the main riser, with parts in section, showing the relative arrangement of the coils constituting the long solenoid system with reference to the guiding tube for the rivets.

Fig. 3 shows a modification in the construction and arrangement of the coils.

Fig. 4 shows a modified form of the visual indicator; by means of which it may be ascertained whether the rivets are flowing properly.

Fig. 5 is a diagrammatic view in elevation of a timing mechanism which may be employed to actuate an escapement device, to release the rivets in the conducting tube, the latter being shown in vertical section.

Referring to the drawings, 10 indicates conventionally a hopper for containing a supply of rivets, which are to be delivered singly to the nail driving mechanism. 11 is a conduit or supply pipe leading from the hopper, and so disposed by suitable means not pertinent to this application, that the rivets may pass freely by gravitation from the hopper into the conduit, the movement of the rivets through the conduit being checked by any suitable escapement device, such as 12, which acts to arrest the further movement of the rivets, and until the latter are released, one at a time, in the regular operation of the escapement. A visual indicator, formed, for instance, as a section of glass tubing 13, is inserted as a section of the conduit 11, and extends to a point near the escapement. As an alternative construction, the visual indicator may be made by cutting a series of longitudinal slots 14 in a section of the conduit 11, as shown in Fig. 4. By means of the said visual indicator, irrespective of its form, inspection may be made to determine whether the rivets are running out of the hopper and into the conduit 11, so that replenishment of the supply of rivets may be effected, when indicated as necessary.

A traveling electromagnetic field 15 embraces the conduit 11, and extends from a point below the escapement 12 to a point in proximity to that at which the rivets are to be delivered. While in Fig. 1, I have shown the solenoid system as extending both vertically and horizontally, with curved connecting paths, it will be understood that the exact arrangement illustrated need not be followed, but that the solenoid system may extend in any direction which may be desired. The conduit 11 is surrounded by a series of coils, such series being composed of groups of coils 16, 17, and 18, arranged in the sequence named, from the commencement of the solenoid system to the end thereof.

19 indicates any suitable source of current supply, such as for instance, a polyphase generator driven by any suitable means and designed to supply currents to the coils 16, 17 and 18, of each of the groups, through the connections 20, 21 and 22, respectively. The escapement 12 is operated by a timing mechanism which will be actuated synchronously with the elements of the assemblage disclosed in the patent above referred to, so that the rivets will be released at the desired time from restraint by the escapement 12, and permitted to drop to a position within the magnetic field. With the current flowing through the connector 20 at the moment the leading rivet is released from the conduit 11 by the escapement device, the magnetic attraction thus incited in the coil 16 of the first group of coils, will hold the rivet within the magnetic field of the said coil, until the coil 17 is energized by means of the current passing through the connector 21. Whereupon, the current and magnetic attraction of the coil 16 will cease and the rivet will be shifted until finally supported in the magnetic field of the coil 17. The coil 18 will in its turn be energized through the connector 22, and the rivet in transit through the conduit will then pass into the field of the last mentioned coil, co-incident with demagnetization of coil 17. The operations described are repeated through each of the sections of the solenoid system, so that the rivets are carried forward in a steady stream to the points of distribution. It will be observed that in their movement through the long solenoid, the rivets float in spaced relation, determined by the length of the sections comprising each group of coils, and that the delivery thereof is so controlled that they will be supplied to the nailing mechanism in an unbroken succession.

In constructing my device, I arranged the conduit 11 so as to extend from the hopper 10, to the point to which the rivets are distributed, and surround such portions of the length of the conduit with groups of coils in such number as to enable a magnetic field to be established for the transportation of the rivets. As hereinbefore stated, the rivets pass by the action of gravity into the magnetic field, and when released from the said field, such rivets are again acted upon by gravitation, or otherwise, to carry them to the desired positions.

The timing mechanism employed to operate the escapement 12, to release the rivets from the conduit 11 leading from the hopper 10, so that the rivets thus released may fall into the field of magnetic attraction, is illustrated diagrammatically in Fig. 5. In the construction shown, the escapement device 12 is oscillated so as to permit the passage of the rivets singly and in the desired time, by means of a rotating cam 25, which latter is provided with a high point 26, adapted once in each rotation of the cam to contact with the end of the escapement 12, and vibrate the same against the force of the reversely acting expansion spring 27. In such movement, the upper pallet of the escapement will be withdrawn from its engagement with the under side of the head of the leading rivet stored in the conduit, and the rivet will be permitted to drop, it being intercepted by the lower pallet for the moment that the spring 27 is under compression.

As the high point 26 passes from engagement with the escapement 12, the spring 27 will reversely oscillate the escapement, thus releasing the said first rivet. At the same time, the upper pallet will intercept the second rivet and restrain it from movement so long as the escapement bears upon the circumferential face of the cam, and until the high point 26 again comes into action to move the escapement, when the operation described will be repeated.

The cam 25 may be arranged on the shaft 28 with the gear 29. The latter is in mesh with a reducing pinion 30, on the motor shaft, or it may be otherwise driven.

Fig. 2 shows a convenient arrangement of the coils with the abutting ends of the spools in contact with each other. Fig. 3 shows a modification in the construction and arrangement of the coils, in that such coils are produced in the form of truncated cones, indicated 160, 170, 180, which are nested in the manner shown, that is, with the smaller end of one coil inserted within the larger opening in the next adjacent or abutting coil. In this last described construction, the magnetic fields overlap each other in a manner, and the arrangement, in some cases, may conduce to a smoother flow of the rivets from the magnetic field created in one coil into the field of the next adjacent coil.

The conduit 11 may be comprised as a single tube, or of sections of tubing of suitable length, with the grouped coils placed thereon in any desired number of groups, and thus the length of the traveling magnetic field may be varied at will. This last described construction, as indicated in the upper part of Fig. 1, serves to make the arrangement very flexible, and readily adaptable to conditions which change in the production of different types of automobile frames.

While I have referred to a polyphase generator as being employed to supply the electric currents for energizing the coils of each group, it will be understood that direct current may be used and transmitted to the coils by means of a suitable switch or rotating contact drum of any approved form. Or, a plurality of suitably driven direct current generators may be supplied, each connected to one of the lines 20, 21, and 22, and means provided for widely varying the excitation of each in succession repeatedly, so as to produce polyphase pulsating direct currents, which can, in a manner similar to that already described, be utilized to produce a slowly traveling magnetic field. In this case, the connections between successive coils may if desired be such that the magnetic polarities developed will be the same in succeeding groups of coils, whereas in the case of the polyphase alternating current generator, reversal occurs in the connections, from each coil to the next in the same circuit. The construction involving the plurality of direct current generators, or their equivalent, has the advantage that the velocity of travel of the rivets through the conduit can be altered during such transit, or their progress even arrested entirely, without losing control over their positions in space, whereas with alternating current this is practically impossible.

It is not my intention to limit the construction of the invention to the embodiments herein shown, but I reserve the right to make such changes in the form thereof as are within the scope of claims of this patent.

Having thus described my invention, what I claim and desire to secure by Letters Patent of the United States, is:

1. A device for serving rivets to nailing machines, comprising groups of coils, each group constituted of a plurality of coils with the correspondingly arranged coils of each group connected in series, means for progressively energizing the coils of the groups, and means for supplying rivets to the coils in timed cycles, whereby the rivets are carried by the traveling magnetic field in spaced relation.

2. A device for serving rivets to nailing machines, comprising a source of supply and a conduit leading therefrom for guiding the rivets from the source of supply, groups of connected coils, and means for progressively energizing the coils to transport the rivets from one coil to the next as described.

3. A device for serving rivets to nailing machines, comprising a source of supply and a conduit leading therefrom for guiding the rivets from the source of supply, a series of connected coils surrounding the conduit, and means for progressively energizing the coils to transport the rivets from one coil to the next as described.

4. A device for serving rivets to nailing machines, comprising a source of supply and a conduit leading therefrom for guiding the rivets from the source of supply to a nailing mechanism, a series of connected coils, means for progressively energizing the coils to transport the rivets from one coil to the next as described, and means for controlling the entry of the rivets into the magnetic field.

5. A device for serving rivets to nailing machines, comprising a source of supply and a conduit leading therefrom for guiding the rivets from the source of supply to a nailing mechanism, a series of connected coils surrounding the conduit, means for progressively energizing the coils to transport the rivets from one coil to the next as described, and means for controlling the entry of the rivets into the magnetic field.

6. A device for serving rivets to nailing machines, comprising a source of supply and a conduit leading therefrom for guiding the rivets from the source of supply to a nailing mechanism, a series of connected coils, means for progressively energizing the coils of the magnetic field to transport the rivets from one coil to the next as described, and means for admitting the rivets into the magnetic field synchronously with the excitation of the said coils.

7. A device for serving rivets to nailing machines, comprising groups of coils, each group being constituted of a like plurality of coils with the correspondingly arranged coils of each group connected in series, in combination with a polyphase current generator for progressively exciting the series of connected coils of the groups, and means for admitting rivets in succession to the magnetic field, whereby such rivets are carried by the traveling magnetic field in spaced relation.

8. A device for serving rivets to nailing machines, comprising a source of supply for the rivets, a feeding conduit leading therefrom and provided with an indicator by means of which the flow of the rivets through the conduit may be visualized, and means for transporting the rivets through by the conduit.

9. A device for serving rivets to nailing machines, comprising a source of supply for the rivets, a series of coils and means for exciting the same to transport the rivets, and an escapement device intermediate the said source of supply and the series of coils, whereby the rivets may be released to the action of the magnetic field for movement, as described.

In testimony whereof, I have signed my name at Milwaukee, this 22nd day of July, 1920.

R. STANLEY SMITH.

Witnesses:
W. F. WOOLARD,
ELIZABETH MURRAY.